United States Patent [19]

Adachi

[11] Patent Number: 5,798,586
[45] Date of Patent: Aug. 25, 1998

[54] LIQUID COOLED A.C. GENERATOR FOR USE IN VEHICLE

[75] Inventor: Katsumi Adachi, Hyogo, Japan

[73] Assignee: Mitsubishi Denki Kabushiki Kaisha, Tokyo, Japan

[21] Appl. No.: 848,699

[22] Filed: Apr. 29, 1997

Related U.S. Application Data

[63] Continuation of Ser. No. 635,783, Apr. 22, 1996, abandoned, which is a continuation of Ser. No. 225,312, Apr. 8, 1994, abandoned.

[30] Foreign Application Priority Data

Apr. 9, 1993 [JP] Japan ............................ 5-083270

[51] Int. Cl.[6] ................ H02K 9/00; H02K 11/00; H02K 9/16
[52] U.S. Cl. ................................ 310/54; 310/68 D
[58] Field of Search .................... 310/54, 58, 68 D, 310/89

[56] References Cited

U.S. PATENT DOCUMENTS

| | | | |
|---|---|---|---|
| 3,624,432 | 11/1971 | Merz | 310/53 |
| 3,681,628 | 8/1972 | Krastchew | 310/54 |
| 4,739,204 | 4/1988 | Kitamura et al. | 310/68 |
| 4,870,307 | 9/1989 | Kitamura et al. | 310/54 |
| 4,980,588 | 12/1990 | Ogawa | 370/68 |
| 5,095,235 | 3/1992 | Kitamura | 310/54 |

FOREIGN PATENT DOCUMENTS 62-178137  8/1987  Japan ............................ H02K 9/19

*Primary Examiner*—Clayton E. LaBalle
*Attorney, Agent, or Firm*—Sughrue, Mion, Zinn, Macpeak & Seas, PLLC

[57] ABSTRACT

A liquid cooled a.c. generator whose cooling-fluid passage is formed with a thermoconductive tube in order to offer not only excellent watertight reliability but also greater cooling efficiency. In other words, a cooling-fluid passage for use in cooling any part to be liquid-cooled is formed with a good thermoconductive tube.

3 Claims, 5 Drawing Sheets

LIQUID COOLED A.C. GENERATOR FOR USE IN VEHICLE

This is a Continuation of application Ser. No. 08/635,783 filed on Apr. 22, 1996, now abandoned which is a Continuation of application Ser. No. 08/225,312 filed Apr. 8, 1994 now abandoned.

BACKGROUND OF THE INVENTION

1. Field of the Invention

The present invention relates to a liquid-cooled a.c. generator for use in a vehicle.

2. Description of the Prior Art

FIG. 4 is an axial sectional view of a conventional liquid cooled a.c. generator as disclosed in Unexamined Japanese Patent Publication Sho-62-178137/(1987) and FIG. 5 is a partial cutaway elevational view of FIG. 4. In FIG. 4, numeral 1 denotes a rotary shaft to which a pulley 2 is secured; 3, a rotor having a pole core, which is secured to the rotary shaft 1; 5, an excitation coil held on the pole core 4 on the fixed side; 6, a stator core which holds a stator coil 7; and 8, a front bracket for supporting the stator core 6, the front bracket having a cooling-air intake vent 9 and an exhaust vent 10. Further, numeral 11 denotes a fan fitted to the rotor 3; 12, a cast rear bracket for holding a bearing 13, the rear bracket being provided with cooling-fluid inlet and outlet pipes 14 and 15; 16, a recessed cooling-fluid passage in the rear bracket 12; 17, a bracket cover made of an aluminum-plate fitted to the rear bracket 12 and used for watertightly holding the cooling-fluid passage 16 by means of seals 18; 19, a rectifier secured via a heat sink 20 to the bracket cover 17; 21, a voltage regulator secured via a heat sink 22 to the bracket cover 17; 23, a protective cover; and 24 a thermoconductive filler filled between the rear bracket 12 and the stator coil 7.

The cooling action will subsequently be described. The rotary shaft 1 is rotated by a vehicular engine via the belt and the pulley 2. The cooling air is taken in by the fan 11 from the intake vent 9 and made to flow through the front bracket 8 so as to cool the front sides of the bearing 13 and the stator coil 7. The cooling air is then discharged from the exhaust vent 10.

On the other hand, part of a low-temperature cooling fluid in the engine is caused to branch off and introduced from the inlet pipe 14 into the cooling-fluid passage 16. The cooling fluid is then passed through the passage 16 as shown by an arrow in FIG. 5 and caused to flow out of the outlet pipe 15. At this time, the heat of the rectifier 19 and the voltage regulator 21 is transmitted from the respective heat sinks 20 and 22 to the bracket cover 17, whereas the heat of the bearing 13 is transmitted to the rear bracket 12, whereas the heat on the rear side of the stator coil 7 is transmitted from the thermoconductive filler 24 to the rear bracket 12, so that the heat of these component parts is reduced by the cooling fluid being circulated therein.

As set forth above, the cooling fluid circulated in the cooling-fluid passage 16 closed with the bracket cover 17 is used to discharge the heat of the rectifier 19, the voltage regulator 21, the bearing 13 and the stator coil 7 outside in the conventional a.c. generator. Notwithstanding, the necessity of disposing the seals 18 at various places along the cooling-fluid passage 16 results in increasing not only the number of parts but also production cost. As the reliability of their watertightness is greatly affected by the presence of a cavity in the rear bracket 12 and the adherence of the seals 18, there may arise a water leakage problem. Another problem is that the indirect cooling of the stator coil 7 via the rear bracket 12 tends to lower cooling efficiency.

SUMMARY OF THE INVENTION

In view of the foregoing problems to be solved, an object of the present invention is to provide a liquid cooled a.c. generator excellent in watertight reliability attained by forming a cooling-fluid passage with a tube and what is inexpensive and also capable of improving cooling efficiency.

A liquid cooled a.c. generator according to the present invention is so constructed that a cooling-fluid passage is formed with a good thermoconductive tube.

The tube is forced through a tube trough and in the internal space of a bracket and is housed therein.

A thermoconductive filler is used for fixing the tube in the tube trough and the internal space.

Since the cooling-fluid passage is formed with a good thermoconductive tube, watertightness is improvable without the provision of seals and cooling efficiency is also increased.

DESCRIPTION OF THE PREFERRED EMBODIMENTS

Figure 1:
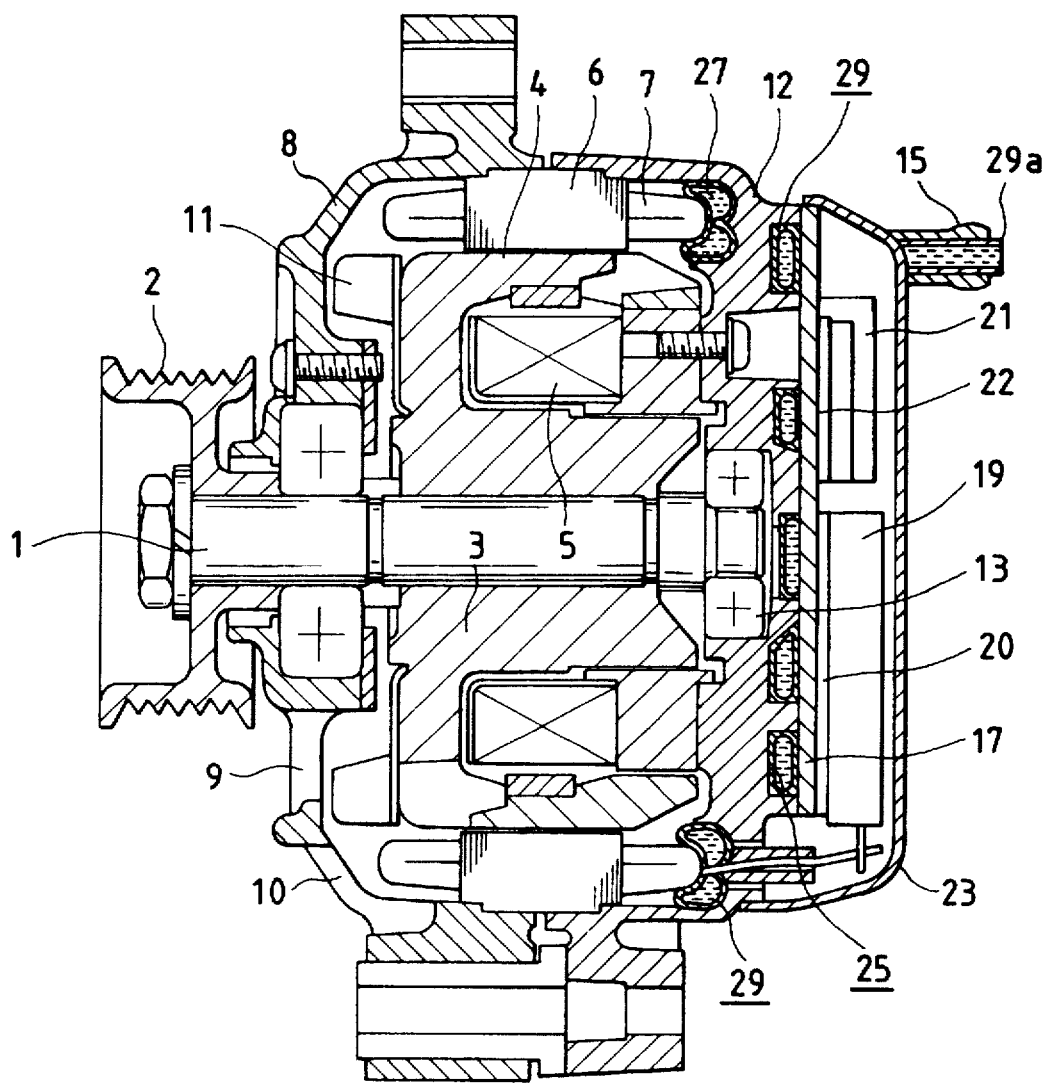
FIG. 1 is an axial sectional view of a liquid cooled a.c. generator embodying the present invention.
Figure 2:
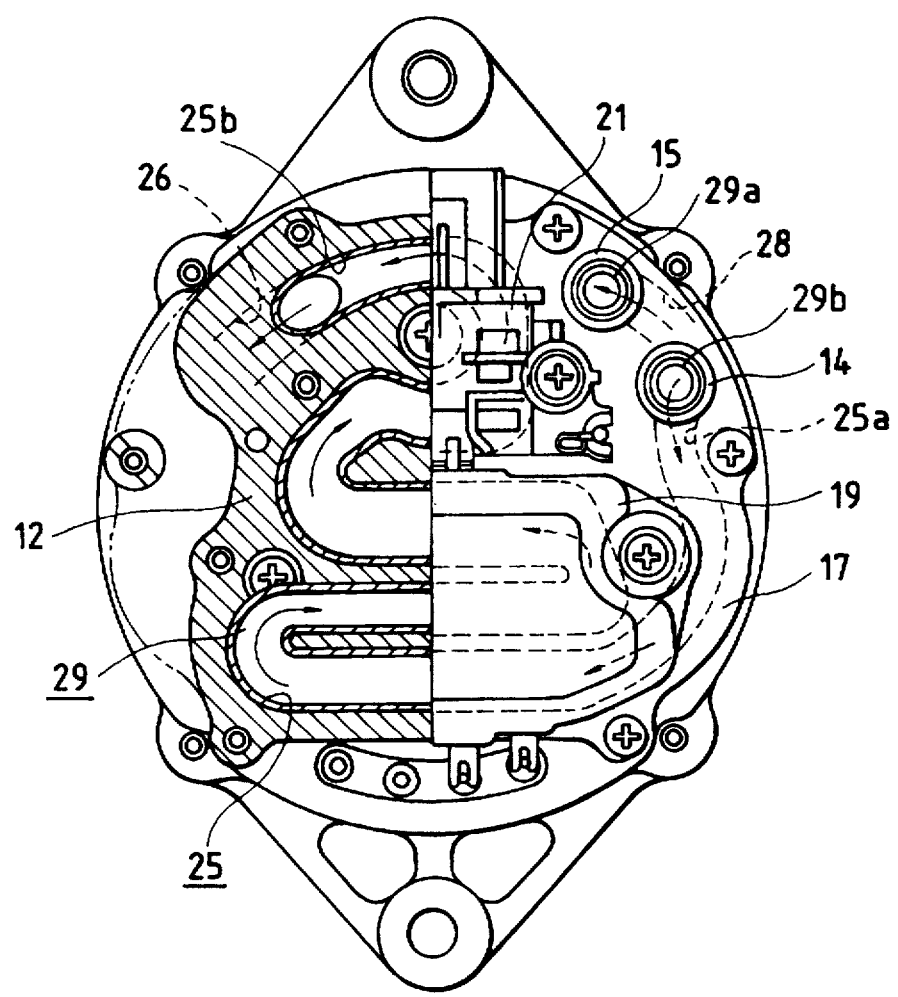
FIG. 2 is a partial cutaway elevational view of FIG. 1.

Referring to FIGS. 1 and 2, an embodiment of the present invention will be described. FIG. 1 is an axial sectional view of a liquid cooled a.c. generator and FIG. 2 is a partial cutaway elevational view of FIG. 1, wherein same reference characters designate corresponding component parts of the aforementioned conventional liquid cooled a.c. generator and the description of them will be omitted. In FIGS. 1 and 2, numeral 25 denotes a tube trough to be closed with a bracket cover 17 provided in a rear bracket 12. One end 25a of the tube trough is connected to an inlet pipe 14, whereas the other end 25b communicates with the internal space 27 of the rear bracket 12 via a through-hole 26. Further, numeral 28 denotes a through-hole for allowing the internal space 27 to communicate with an outlet pipe 15, and 29 a good thermoconductive tube forming the cooling-fluid passage, the thermoconductive tube being made of thermoconductive, flame- and heat-resistant silicone rubber.

First, the tube 29 is passed through the through-hole 26 of the rear bracket 12 in such a state that the rear bracket 12 is free from the bracket cover 17 before being fitted to the body of a front bracket 8. The tube 29 projected inside the rear bracket 12 is wound twice in the internal space 27 and then the rear end 29a of the tube 29 is fitted into the outlet pipe 15 via the through-hole 28. Then the tube 29 projected outside the rear bracket 12 is forced through the tube trough 25 and the rear end 29b of the tube 29 is fitted into the inlet pipe 14. After the rear bracket 12 is fixed to the body, the bracket cover 17 is secured thereto so as to contain the tube 29 in the tube trough 25 and the internal space 27. When the pressure of the cooling fluid is applied to the tube 29 in this state, it will be inflated and settled in position as shown in FIGS. 1 and 2.

Seals can thus be dispensed with since the cooling-fluid passage is formed with one tube 29 and the watertightness is improved. The low-temperature cooling fluid introduced from the inlet pipe 14 starts cooling the rectifier 19, the voltage regulator 21 and the bearing 13 which are giving off low-temperature heat and then flows into the stator coil 7 having high-temperature heat before flowing out of the outlet pipe 15. Therefore, the cooling operation can be performed with efficiency. Moreover, a greater cooling effect is achievable as the stator coil 7 that has conventionally been cooled indirectly can be cooled directly by the tube 29.

Figure 3:
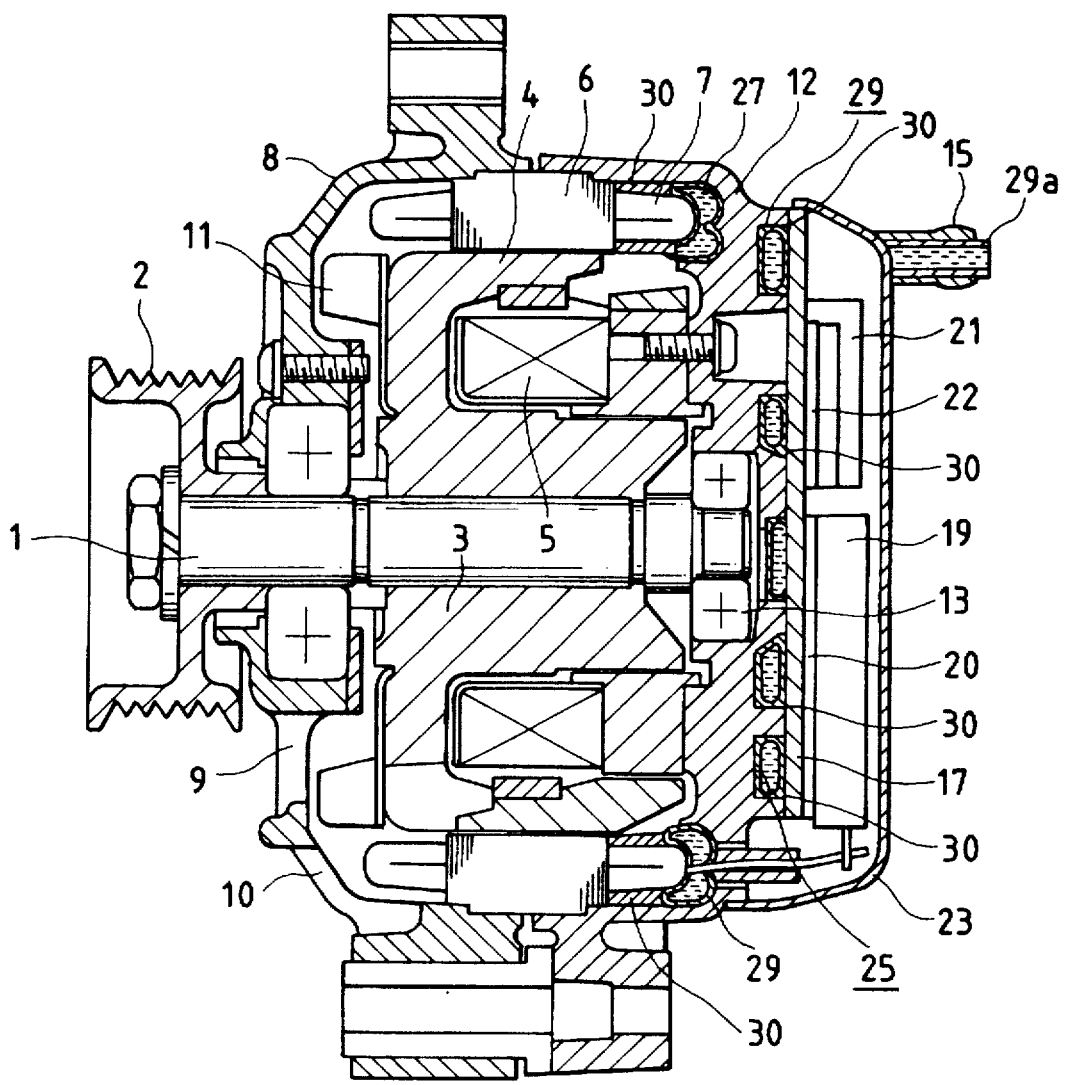
FIG. 3 is an axial sectional view of another liquid cooled a.c. generator embodying the present invention.
Figure 4:
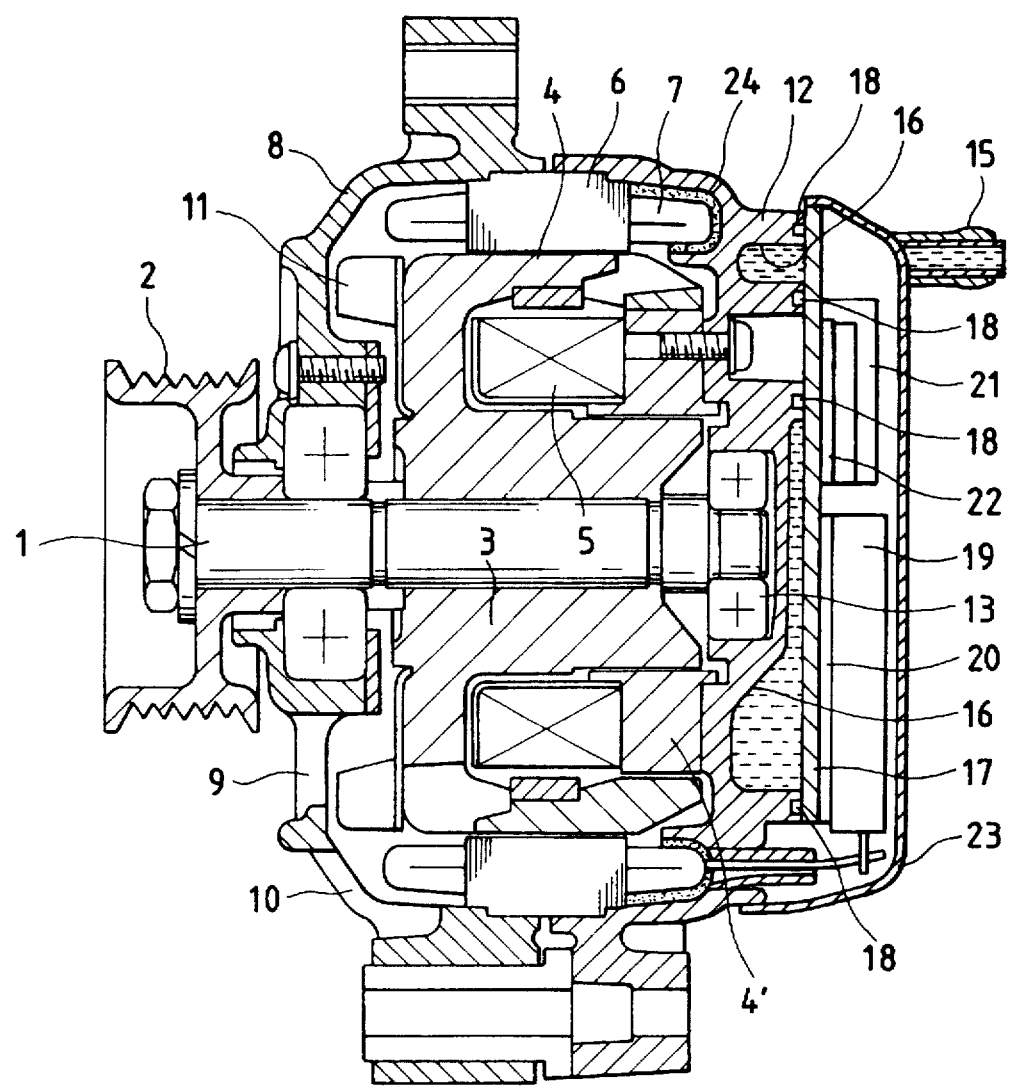
FIG. 4 is an axial sectional view of a conventional liquid cooled a.c. generator.
Figure 5:
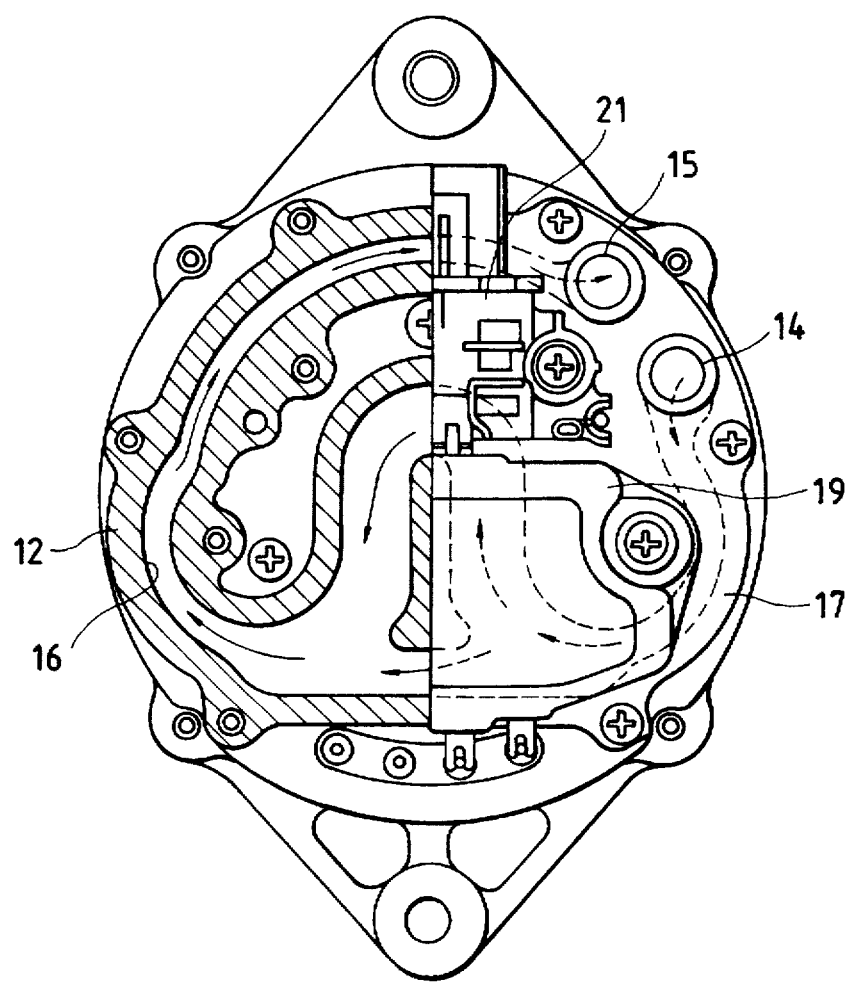
FIG. 5 is a partial cutaway elevational view of FIG. 4.

If the opening formed on the outer periphery of the tube 29 housed in the tube trough 25 and the internal space 27 as shown in FIG. 3 according to the first aspect of the present invention is filled with a thermoconductive filler 30, not only the pressure resistance but also the thermoconductivity of the tube 29 improves, thus increasing the cooling efficiency further.

Although the front side is to be air-cooled by the fan 11 according to the first and second aspects of the present invention, the front side like the rear side may be water-cooled by the tube in order to water-cool the whole structure.

As set forth above, the cooling-fluid passage formed with one tube according to the present invention has the effect of making such a liquid cooled a.c. generator less costly and also improving its watertight reliability and cooling efficiency.

What is claimed is:

1. A fluid-cooled a.c. generator for use in a vehicle, comprising:

a rotary shaft driven by an engine of the vehicle;

a rotor core fixed to said rotary shaft and adapted to be excited by an excitation coil;

a stator core surrounding said rotor disposed opposite an outer periphery of said rotor core and mounting a stator coil wound on said stator core:

a one piece thermoconductive fluid tube located within said generator and defining a cooling-fluid passage; and a bracket member on which a tube trough is formed, and a bracket cover to close said tube trough;

wherein said one piece thermoconductive fluid tube is placed within said tube trough and in an internal space of said bracket member so as to house the tube therein.

2. A fluid cooled a.c. generator as claimed in claim 1, wherein a thermoconductive filler is used for fill-fixing the one piece tube in the tube trough and the internal space.

3. A fluid cooled a.c. generator as claimed in claim 1, wherein said flexible one piece thermoconductive fluid tube is made of silicon rubber.

* * * * *